June 6, 1961 A. G. MEAKER ET AL 2,987,342
LATERALLY EXPANSIBLE CHASSIS CONSTRUCTION
FOR HOUSE TRAILERS
Filed Jan. 20, 1958 2 Sheets-Sheet 1
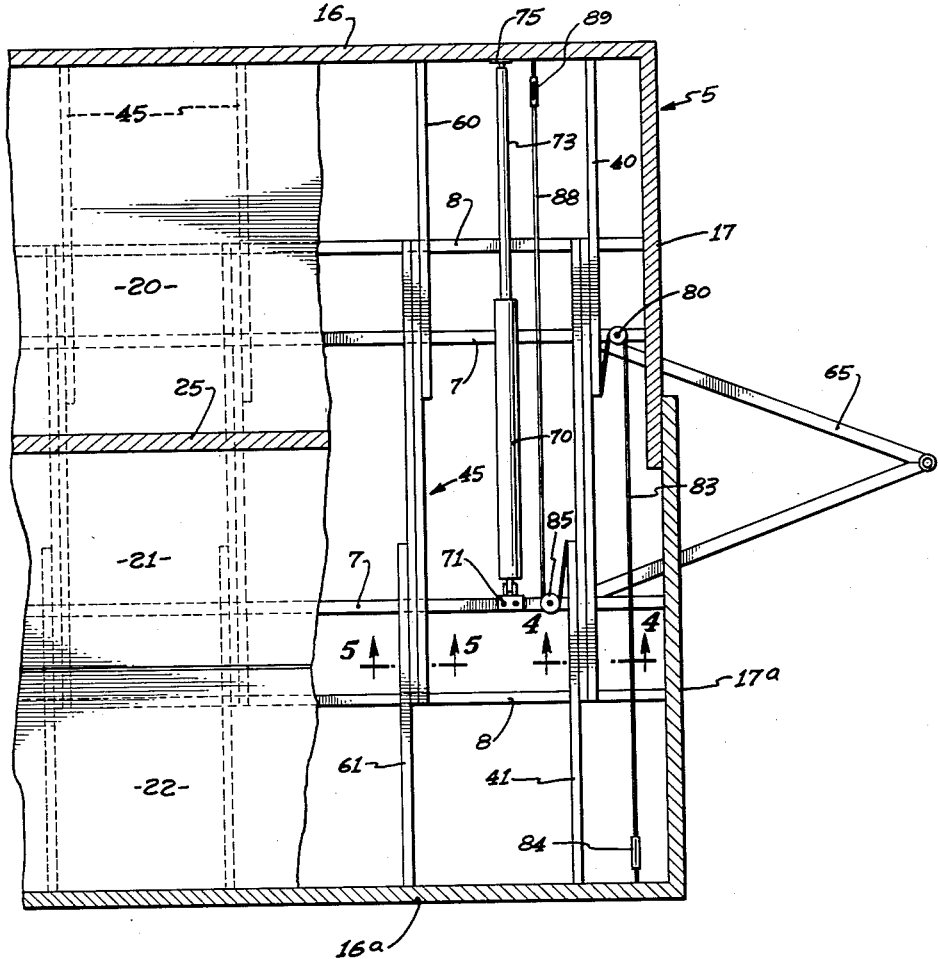
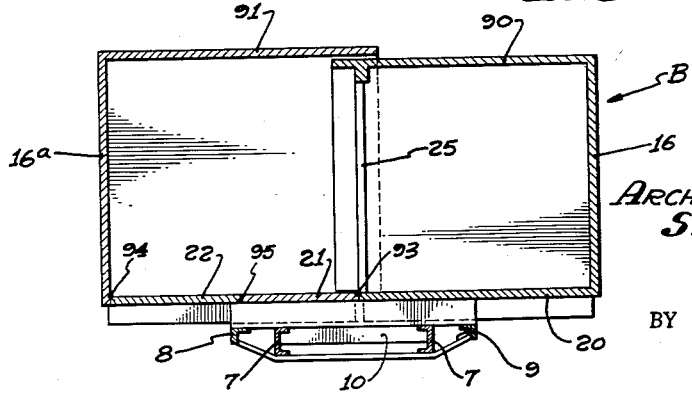
ARCHIBALD G. MEAKER
STANLEY B. MEAKER
INVENTORS.
BY Mason Graham
ATTORNEYS.

June 6, 1961  A. G. MEAKER ET AL  2,987,342
LATERALLY EXPANSIBLE CHASSIS CONSTRUCTION
FOR HOUSE TRAILERS
Filed Jan. 20, 1958  2 Sheets-Sheet 2

ARCHIBALD G. MEAKER
STANLEY B. MEAKER
INVENTORS.

BY Marom & Graham

ATTORNEYS.

United States Patent Office 2,987,342
Patented June 6, 1961

2,987,342
LATERALLY EXPANSIBLE CHASSIS CONSTRUCTION FOR HOUSE TRAILERS
Archibald G. Meaker, Arlington, Calif. (Rte. 2, Box 230, Corona, Calif.), and Stanley B. Meaker, 10156 Arlington, Ave., Arlington, Calif.
Filed Jan. 20, 1958, Ser. No. 709,896
2 Claims. (Cl. 296—23)

This invention has to do with improvements in laterally expansible and contractible chassis construction for such vehicles as house trailers and the like.

A primary object of the invention is to provide an improved means for moving the sides and the chassis between expanded and contracted positions.

For instance, in the copending application of Archibald G. Meaker, Serial No. 634,305, filed January 15, 1957, and now Patent No. 2,901,252; there is shown a laterally expansible and contractible chassis in which the sides are expanded and contracted by fluid actuated piston and cylinder arrangements operatively connected to both sides of the chassis—that is, one set of fluid motors comprising pistons and cylinders directly operate one side of the chassis while another set of piston-cylinder arrangements directly operate the other side. An objectionable feature of this type of construction is that unless all the piston-cylinder arrangements at all times are made to operate in substantially perfect unison, a jamming action sometimes occurs.

It is therefore a more particular object of this invention to provide a construction wherein the piston and cylinder arrangements are operatively connected to one side only of the chassis while cable and sheave arrangements are provided to move the opposite side in unison and in response to movement of the side to which the piston-cylinder arrangement is operatively connected.

For the purpose of explaining how to make and use my present improvements, we shall now describe a preferred embodiment thereof for which purpose we shall refer to the accompanying drawings wherein:

FIG. 1 is a top plan view;

FIG. 2 is a somewhat schematic sectional view showing the chassis and its carried body expanded;

Figure 3:
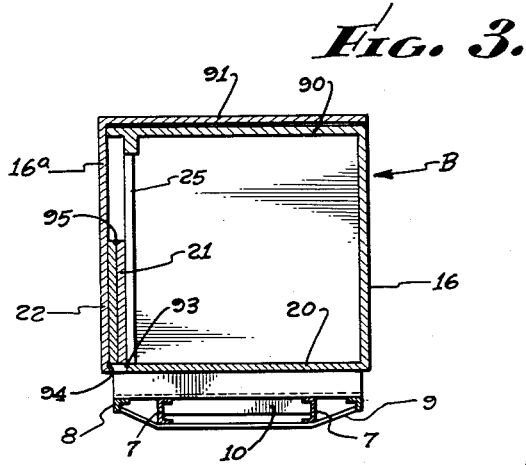
Figure 4:
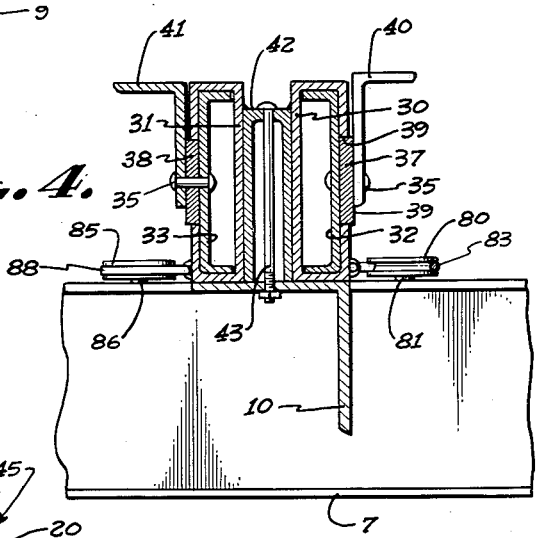
Figure 5:
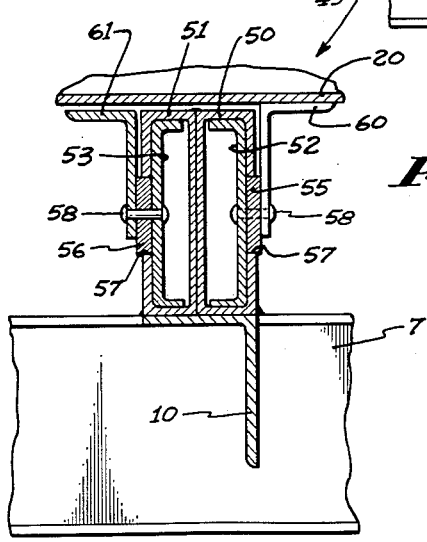

FIG. 3 is a view similar to FIG. 2 but showing the chassis and body contracted; and, FIGS. 4 and 5, respectively, are enlarged sections taken on lines 4—4 and 5—5, respectively of FIG. 1.

Referring now to the drawings, the numeral 5 generally denotes a laterally expansible and contractible chassis which is adapted to be supported in the usual manner by conventional road wheels, not shown.

The chassis comprises longitudinal channel iron beams 7, angle iron secondary beams 8, transverse bracing strips 9, angle iron cross-members 10, parallel sides 16, 16a, and telescopically associated ends 17, 17a, the chassis carrying a permanently horizontal floor portion 20, jack-knifing floor sections 21, 22 and a longitudinal partition wall 25.

For supporting the sides and ends from the beam members 7, we provide, at each end of the chassis, a pair of track members 30, 31 (FIG. 4) each of which is of C-shaped cross section and each carrying a slide 32, 33 of channeled cross section. Each of said slides has affixed thereto, as by rivets 35, a slide block 37, 38 which slideably engages between the spaced contiguous outer edges 39 of the track members. Each of the slide blocks has secured thereto, as by rivets 35, an angular iron floor joist 40, 41. The joist 40 supports the permanently horizontal floor portion 20 and is slightly elevated above the top of joist 41 so as to permit the joist 41 to pass beneath the floor portion 20 during expansive and contractive movement. Joist 41 supports the jack-knifing floor section 21, 22 when the latter are in horizontal position, as is the case when the chassis is expanded.

The track members 30, 31 are secured, in spaced, back-to-back relationship, to the beams 7 and 8 by a U-shaped spacer 42 and bolts 43. Said track members may also be welded to the beams if desired.

Spaced apart longitudinally of the chassis, between its ends, we provide a number of track and slide assemblies 45 (FIG. 5).

Each of the assemblies 45 comprises a pair of track members 50, 51 each of C-shaped cross section and each carrying a slide 52, 53 of channeled cross section. A slide block 55, 56 slideably engages the spaced contiguous outer edges 57 of the respective track members, each slide block being secured to its carrying slide by rivets 58, which rivets also secure to the respective slide blocks a floor joist 60, 61. The joist 60 supports the permanently horizontal floor 20 and is slideably elevated above the top of joist 61 so as to enable the joist 61 to pass beneath the floor 20 during movement. The joist 61 supports the jack-knifing floor sections 21, 22 when the latter are in horizontal position as shown in FIGS. 1 and 2. The tracks 50, 51 are welded together in back-to-back relationship and are also welded to the beams.

A conventional V-shaped pull tongue 65 is secured, as by welding or any other suitable manner, at its inner end to the beams 7.

Adjacent each end of the chassis we pivotally mount a cylinder 70 by means of a bracket 71 secured to one of the beams, and a piston, having a piston rod 73, is reciprocally carried in the cylinder. Conventional valve-controlled fluid lines, not shown, pass fluid under pressure to and from the respective ends of the cylinders. Each piston rod 73 is pivotally connected, at 75, at its outer end to side 16.

Each of the floor joists 40 is secured at its outer end to the side 16, while each of the joists 41 is secured at its outer end to the side 16a; and each of the joists 60 is secured at its outer end to the side 16, while each of the joists 61 is secured at its outer end to the side 16a.

As will be apparent, the side 16, ends 17 and floor portion 20 move in response to actuation of the pistons 73. However, for moving side 16a, ends 17a and for moving the floor sections 21, 22 between horizontal and jack-knifed positions, we provide cable and sheave arrangements, now to be described.

A sheave 80 is rotatably secured to one of the beams 7 by stub shaft 81, and a cable 83 is secured at one end, through a turnbuckle 84, to side 16a, passes around the sheave, and is secured at its other end to the inner end portion of joist 40. A second sheave 85 is rotatably secured to the other beam 7 by stub shaft 86, and a cable 88 is secured, through a turnbuckle 89, to side 16, extends around the sheave 85 and is secured at its other end to the inner end portion of joist 41. While we have described only two of said sheave-cable arrangements, it will be understood that a like arrangement is provided at least at the opposite end of the chassis, not shown.

Thus, as the pistons move side 16 between expanded and contracted positions, the cable and sheave arrangements function to move side 16a in unison with and in response to movement of side 16, so that it is unnecessary to have both sides directly actuated by pistons.

In Fig. 3 the chassis and its supported body B, which also has telescopic top portion 90, 91, are in contracted position, in which position the permanently horizontal floor 20 is centered on the chassis while the floor sections 21, 22 are jack-knifed into upright position, having their outer edges hingeably connected to the floor 20 and sides 16a, respectively by hinges 93, 94 and having their contiguous edges hinged together by hinge 95.

When it is desired to laterally expand the chassis and body into the position of FIG. 2, fluid is introduced under pressure behind the pistons in cylinders 70 to move side 16, floor 20 and ends 17 laterally outwardly while cable 88 and sheave 85 function to move side 16a and ends 17a, outwardly and to move the floor 21, 22 from jack-knifed to horizontal position, as shown in FIG. 2. To return the chassis and body to the contracted position of FIG. 3 fluid is introduced ahead of the pistons to cause the latter to move side 16, ends 17 and floor 20 inwardly, in response to and in unison with which movement the cable 83 and sheave 80 function to pull side 16a and ends 17a inwardly to the position of FIG. 3. Thus, since side 16a moves in response to movement of side 16, there is no difficulty in maintaining operation in which both sides move in unison without there being any jamming of the mechanism.

We claim:

1. In a laterally expansible and contractable vehicle, a chassis, a pair of parallel track members carried by and disposed transversely of said chassis, each of said track members being of a length substantially co-extensive with the contracted width of said vehicle, a pair of side members disposed at opposite sides of said chassis for relative lateral movement relative to said chassis, a first slide member longitudinally slideably engaging the first of said track members and secured at its outer end to the first of said side members, a second slide member longitudinally slideably engaging the second of said track members and secured at its outer end to the second of said side members, a cylinder disposed transversely of and secured at its inner end to said chassis, a fluid actuated piston reciprocally mounted in said cylinder, a piston rod secured at its inner end to said piston and secured at its outer end to the first of said side members, a pair of sheaves rotatably carried by said chassis, a first cable trained about one of said sheaves, said first cable being secured at one end to the first of said side members and being secured at its other end to the inner end portion of the second of said slide members, and a second cable trained about the other one of said sheaves, said second cable being secured at one end to the other one of said side members and secured at its other end to the inner end portion of the first of said slide members.

2. The combination of claim 1 wherein said cylinder is pivotally secured at its inner end to said chassis.

References Cited in the file of this patent

UNITED STATES PATENTS

| Re. 24,452 | Meaker | Apr. 8, 1958 |
| 2,147,892 | Gray | Feb. 21, 1939 |
| 2,801,878 | Rawlings | Aug. 6, 1957 |